United States Patent [19]
Pierce

[11] 3,985,185
[45] Oct. 12, 1976

[54] TILLER COMBINATION
[75] Inventor: Lester V. Pierce, Pocatello, Idaho
[73] Assignee: The Raymond Lee Organization, Inc., New York, N.Y.; a part interest
[22] Filed: Feb. 6, 1975
[21] Appl. No.: 547,722

[52] U.S. Cl. .............................. 172/81; 172/123; 172/112
[51] Int. Cl.² ........................................ A01B 33/00
[58] Field of Search ............ 172/108, 508, 81, 517, 172/123, 112

[56] References Cited
UNITED STATES PATENTS

| | | | |
|---|---|---|---|
| 777,586 | 12/1904 | Beauchamp | 172/81 |
| 2,592,097 | 4/1952 | Younger | 172/81 X |

*Primary Examiner*—George J. Marlo
*Attorney, Agent, or Firm*—Daniel Jay Tick

[57] ABSTRACT

A support device is mounted on the center frame of a garden tiller and extends beyond the opposite sides of the garden tiller. The support device is adjustable in the dimension corresponding to the width of the garden tiller. Adjustable mounting devices are adjustably affixed to the opposite ends of the support devices and are adjustable in position relative to the support devices. Each of a pair of shield plates is removably mounted in a corresponding one of the adjustable mounting devices. The shield plates are mounted substantially vertically in spaced parallel relation each at a corresponding side of the garden tiller and substantially perpendicular to the support device.

5 Claims, 4 Drawing Figures

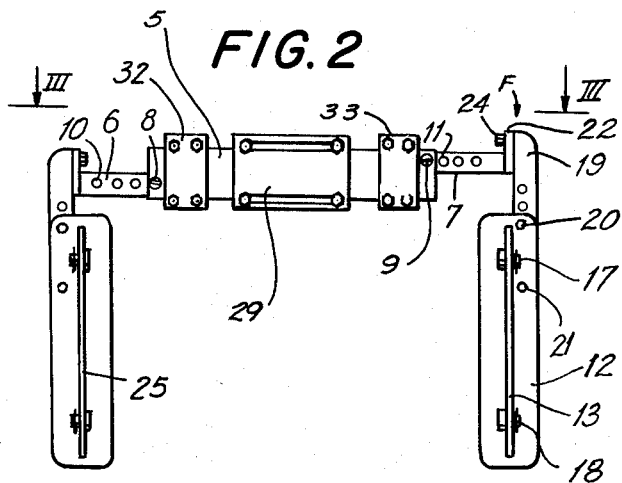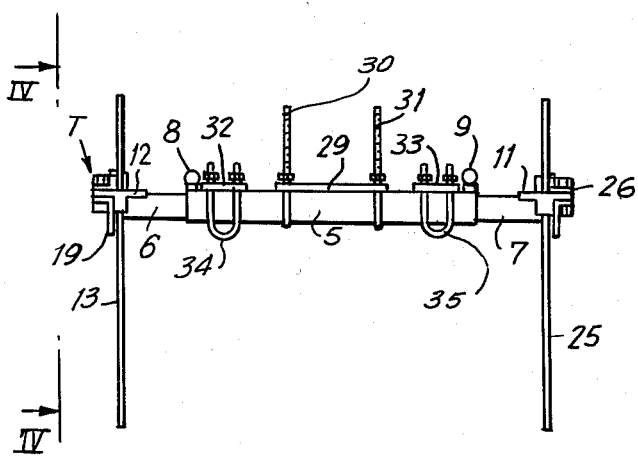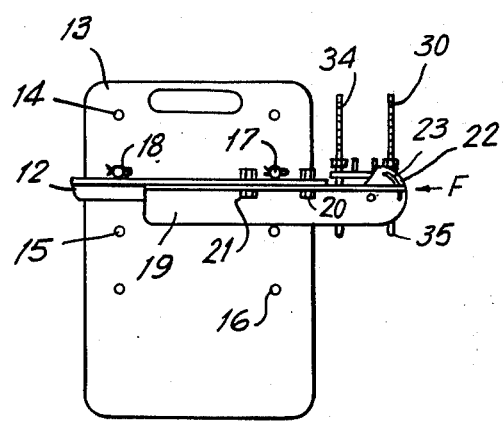

TILLER COMBINATION

BACKGROUND OF THE INVENTION

The present invention relates to an accessory in combination with a garden tiller.

Objects of the invention are to provide an accessory for a tiller, which accessory is of simple structure, sturdy, strong and reliable in structure to permit use of a tiller regardless of the condition of vegetation in the area being tilled, and is maintainable and adjustable with facility, convenience and ease for desired positioning in different directions.

BRIEF DESCRIPTION OF THE DRAWINGS:

In order that the invention may be readily carried into effect, it will now be described with reference to the accompanying drawings, wherein:

FIG. 2 is a plan view of the embodiment of FIG. 1;

FIG. 3 is a front view, taken along the lines III-III, of FIG. 2; and

FIG. 4 is an end view, taken along the lines IV-IV, of FIG. 3.

In the FIGS., the same components are identified by the same reference numerals.

DETAILED DESCRIPTION OF THE INVENTION

Figure 1:
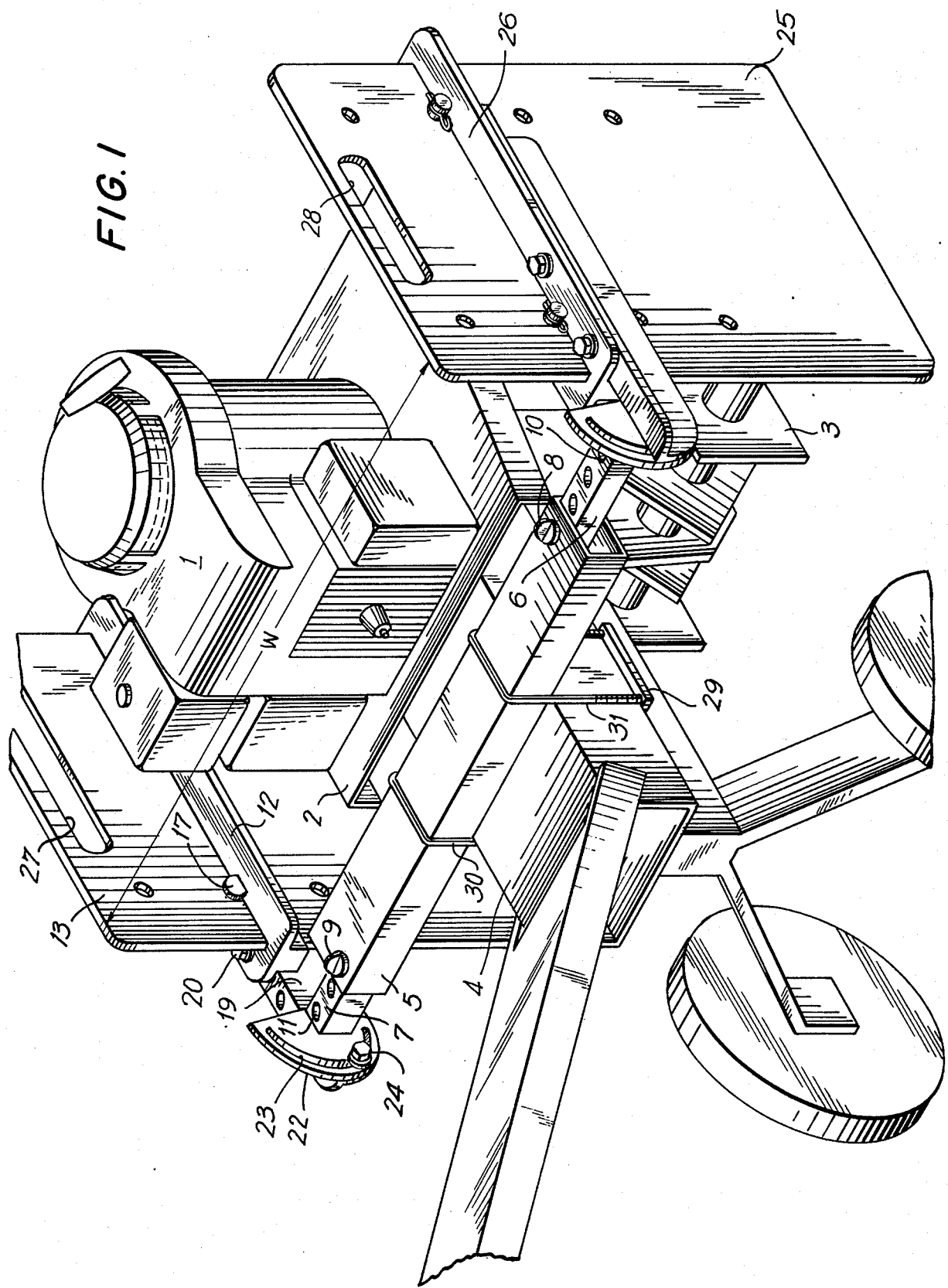
FIG. 1 is a perspective view of an embodiment of the tiller accessory of the invention mounted on a tiller.

The tiller accessory of the invention is for a garden tiller 1 having opposite sides 2 and 3, a width W determined by the opposite sides, and a center frame 4, as shown in FIG. 1.

The tiller accessory of the invention comprises a supporting device mounted on the center frame 4 of the tiller and extending beyond both sides 2 and 3 of the tiller. The supporting device is adjustable in the dimension corresponding to the width W of the tiller. The supporting device comprises a main accessory mount 5 having width adjusting bars 6 and 7. The width adjusting bars 6 and 7 are movably mounted at the opposite ends of the main accessory mount member 5 and extend substantially coaxially therewith from the opposite ends thereof.

Lock devices 8 and 9 of any suitable type such as, for example, set pins, locating pins, or the like, are provided at both ends of the mount member 5 for releasably securing the width adjusting bars 6 and 7 at desired positions relative to the mount member. This is accomplished by a plurality of holes 10, and so on, and 11, and so on, in the width adjusting bars 6 and 7, respectively. The locating pins 8 and 9 are seated in selected ones of the holes 10, and so on, and 11, and so on, to vary the overall length of the mount 5 and the width adjusting bars 6 and 7, which is the dimension corresponding to the width W of the tiller.

Adjustable mounting apparatus is affixed to the opposite ends of the supporting device and is adjustable in position relative to the supporting device. The mounting apparatus is provided in a right set and a left set, substantially identical to each other, except that they are symmetrical in configuration relative to each other. Since the right and left sets of mounting apparatus are identical to each other in symmetrical relation, one set thereof is described in detail hereinafter. Thus, for example, the right set of mounting apparatus comprises a horizontal adjustment arm or shield bracket 12 having a front F and a top T. The shield bracket 12 mounts a shield plate 13 at a selected position relative to the front F and a selected position relative to the top T of said sheild bracket. This is accomplished by providing a plurality of spaced bores 14, 15, 16, and so on, through the shield plate 13 extending in two generally substantially vertical columns.

The shield plate 13 is placed in a slot formed through the shield bracket 12 and is prevented from slipping completely through the slot by a pair of shield adjustment retaining pins and keepers 17 and 18 which are seated in selected ones of the bores 14, 15, 16, and so on. The retaining pins and keepers 17 and 18 are prevented from slipping through the selected bores by cotter pins shown in FIGS. 1 and 4.

Each set of mounting apparatus is mounted on a corresponding end of the supporting device in a manner whereby each of the horizontal adjustment arms or shield brackets and the shield plate mounted therein is selectively releasably affixed a predetermined distance behind the supporting device and is rotatable through a predetermined arc about the axis of the supporting device. Thus, the horizontal adjustment arm 12 is movably mounted in substantially axial directions on a horizontal extension arm 19 affixed to the free end of the width adjusting bar 7.

The shield bracket 12 may be secured in any selected position on the horizontal extension arm 19 via a pair of spaced bores formed through said bracket and a plurality of spaced bores formed through said extension arm. A pair of shield bracket mounting bolts 20 and 21 are passed through aligned bores of the shield bracket 12 and the horizontal extension arm 19 when said bracket is placed in a desired position on said extension arm.

The horizontal extension arm 19 is affixed to the free end of the width adjusting bar 7 via a horizontal adjustment plate 22. The horizontal adjustment plate 22 has an arcuate substantially semicircular slot 23 formed therethrough. A horizontal adjustment retaining bolt 24 extends through the slot 23 of the horizontal adjustment plate 22 and is affixed to the horizontal extension arm 19. Thus, the front end of the horizontal adjustment arm 19 may be placed at any desired position in the slot 23 by loosening the bolt 24 and then tightening said bolt when said extension arm is at a desired inclination.

The shield plates 13 and 25 are thus slidably mounted in the horizontal adjustment arms or shield brackets 12 and 26, respectively, in a manner whereby the shield plates are freely movable in directions upward from the tops T of said arms and are restricted in movement in directions downward from the tops of said arms relative to a selected part of each plate.

The shield plates 13 and 25 are readily removable from their supporting shield brackets 12 and 26, respectively, by means of hand holds 27 and 28, respectively.

The main accessory mount 5 is affixed to the center frame 4 of the tiller by a center frame mounting plate 29 and a pair of center mount U-bolts 30 and 31. Handle mounting plates 32 and 33 may be utilized to mount the main accessory mount 5 on the tiller, depending upon the configuration of said tiller. This is accomplished via handle mount U-bolts 34 and 35, respectively.

While the invention has been described by means of a specific example and in a specific embodiment, I do not wish to be limited thereto, for obvious modifications will occur to those skilled in the art without departing from the spirit and scope of the invention.

I claim:

1. An accessory in combination with a garden tiller having opposite sides, a width determined by the opposite sides, a center frame, and including rotary tines at the opposite sides, said accessory comprising a pair of shield plates;

supporting means for supporting the shield plates adjustably relative to each other in height, said supporting means being mounted on the center frame of a tiller and extending beyond both sides of the tiller, said supporting means being adjustable in the dimension corresponding to the width of the tiller; and adjustable mounting means adjustably affixed to the opposite ends of the supporting means and adjustable in position relative to the supporting means, each of said shield plates being removably mounted in a corresponding one of the adjustable mounting means whereby the shield plates are mounted substantially vertically in spaced parallel relation each at a corresponding side of the tiller and substantially perpendicular to the supporting means whereby said shield plates extend as shields at the outer extremities of the tines of the tiller.

2. The combination as claimed in claim 1, wherein the supporting means comprises a main accessory mount member having width adjusting bars movably mounted at the opposite ends thereof and extending substantially coaxially therewith from said opposite ends and lock means at both ends for the mount member for releasably securing the width adjusting bars at desired positions relative to the mount member.

3. The combination as claimed in claim 1, wherein each of the mounting means has a front and a top and includes means for mounting a shield plate at a selected position relative to the front and a selected position relative to the top of the mounting means.

4. The combination as claimed in claim 3, wherein each of the mounting means comprises a horizontal adjustment arm having a top and removably mounting a shield plate at a selected position relative to the top of the horizontal adjustment arm and means for mounting each of the mounting means on a corresponding end of the supporting means in a manner whereby each of the horizontal adjustment arms and the shield plate mounted therein is selectively releasably affixed a predetermined distance behind the supporting means and is rotatable through a predetermined arc about the axis of the supporting means.

5. The combination as claimed in claim 4, wherein each of the shield plates is slidably mounted in a corresponding one of the horizontal adjustment arms in a manner whereby the shield plates are freely movable in directions upward from the tops of said arms and are restricted in movement in directions downward from the tops of said arms relative to a selected part of each plate.

* * * * *